Aug. 31, 1965  L. M. POLINSKI ETAL  3,203,252
MEANS AND METHOD OF CATALYST ANALYSIS
Filed May 2, 1962  2 Sheets-Sheet 1

*INVENTORS*
LEON M. POLINSKI
LEONARD M. NAPHTALI
BY

ATTORNEY

United States Patent Office 3,203,252
Patented Aug. 31, 1965

3,203,252
MEANS AND METHOD OF CATALYST
ANALYSIS
Leon M. Polinski, 29 Farrugut Road, Plainfield, N.J., and
Leonard M. Naphtali, 575 West End Ave., New York,
N.Y.
Filed May 2, 1962, Ser. No. 191,929
4 Claims. (Cl. 73—432)

Our invention relates to a means and method of catalyst analysis and more particularly to a means and method of determining the adsorption rates of various gases when in the presence of a catalyst and under varying conditions of controlled volume, pressure and temperature.

Prior to our invention it was not possible to separate simultaneously occurring adsorptions of diffusions of various gases on or through a catalyst except by making assumptions based on the total adsorption. These assumptions were made, in general, by curve fitting the total adsorption to an empirical equation, such as the Elovich equation, and the result of the graphical separation was used either to compare catalyst adsorptions for their own sake or to relate adsorption to catalytic activity in an empirical manner.

Heretofore, on measuring catalytic adsorption on a time vs. pressure (constant volume) basis or a volume vs. time (constant pressure) basis, a large amount of extrapolation and assumption has been necessary, especially at very short and very long periods of test; whereas the herein disclosed means and method can give an accurate and clearly defined analysis to produce a true picture of catalyst adsorption without extrapolation or unnecessary assumptions as to the number of adsorptions occurring.

One of the objects of our invention is to provide a means for determining the simultaneously occurring rates and magnitudes of adsorption and diffusion of various gases on or into a catalyst under different conditions of pressure and temperature.

Another object of our invention is the provision of a method of determining the simultaneously occurring rates and magnitudes of adsorption or diffusion of various gases on or into a catalyst under varying conditions of temperature and pressure.

Other objects and advantages of our invention will be apparent to those skilled in the art by reference to the specification, description and the drawings in which:

FIG. 1 is a front view showing the particular apparatus used in our invention.

FIG. 3 is a top view of our invention.

Figure 2:
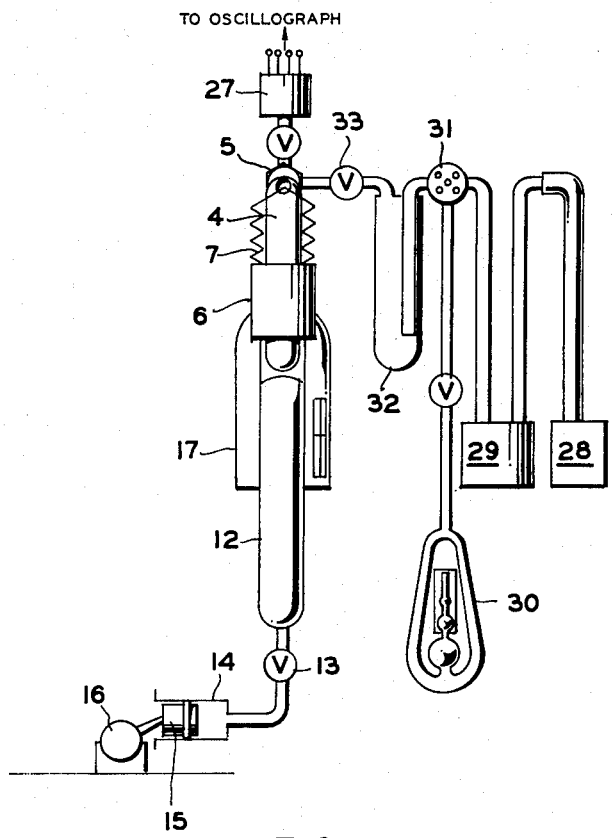
FIG. 2 is a side elevation of the apparatus shown in FIG. 1.

Referring to the drawings, 4 is an adsorption chamber which is connected into the systems pipe network by an air-tight union 5 in such a manner that the chamber 4 may be removed and filled with any desired catalyst. The chamber 4 is surrounded by a heat coil 6 having a controlling thermocouple 7 which is inserted into the center of the chamber 4 for the purpose of maintaining any preselected temperature. Leading from union 5 is a conduit 8 having a valve 9 connected between conduit 8 and a manifold 10; said manifold, at its central portion, being connected through valve 11 to the upper portion of a mercury column 12; said mercury column, at its lower portion, being connected through valve 13 to the outlet portion of a cylinder pressure pump 14. Pump 14 has a reciprocating piston 15 therein, the piston being appropriately connected by a drive rod to a variable speed motor 16 which can vary the frequency of the stroke of piston 15, for a purpose which will later be explained. The cylinder 14 and piston 15 together as a system may be replaced by a system of larger or smaller diameter so as to displace a larger or smaller volume as desired; thus the amplitudes of pulsation may be varied.

The end of manifold 10, away from valve 9, is connected to a source of gas pressure 17 through conduit 18 and is interrupted by valve 19. Between manifold 10 and valve 19 there is located a mercury manometer 20 for determining system operating pressure; said manometer being capable of shut-off from the system by means of valves 21 and 22. Also interrupting conduit 18 are conduits 23 and 24 containing valves 25 and 26 leading into and out of a pressure-to-electrical impulse transducer 27, such as is well known in the art; said electrical responses of the transducer being connected to an oscillograph (not shown) for the purpose of recording data continuously.

Also connected into the system, as shown by the drawings, are a mechanical vacuum pump 28 and a diffusion pump 29 (said diffusion pump being a non-mechanical vacuum pump as is well known in the art), a vacuum gauge 30, such as a McLeod gauge, a vacuum leak indicator 31, such as a Pirani gauge and a gas trap 32, all connected together with appropriate valves so that they may be individually or collectively turned off or on as will be explained under operation.

Operation

A catalyst, usually in extruded, flaked or tableted form is inserted into the chamber 4 which is surrounded by heat coil 6 controlled by means of thermocouple 7 inserted in the cavity of the chamber 4. Next, if so desired, the catalyst is activated by heating with the heat coil in the presence of a gas such as hydrogen, which is allowed to flow, into the previously evacuated system, before and during activation (or calcining) by opening valves 19 and 9. After calcining has been completed to the desired degree impurity, contaminant or other additive of known composition and amount may, if desired, be allowed to enter the system. The system is evacuated either after the calcining operation or after the addition operation by opening all valves except 13 and 19 and activating the mechanical vacuum pump 28.

After the pressure in the system has been lowered the diffusion pump 29 is activated to further lower the pressure to about .03 to .2 micron. Now valves 22 and 33 are closed and valve 19 is again opened and gas allowed to bleed into the system until the pressure reaches the point where system adsorption equilibrium is reached at a predetermined pressure, usually somewhere between 5 and 100 mm. Hg, at which time valve 25 is closed; but it will be understood that the gas bleeding operation can be stopped when pressure as low as 1.0 mm. Hg are reached. This equilibrium pressure will be read off the manometer 20 by means of a cathetometer (not shown) and the tests are now ready to be made.

With valves 19, 22, 25 and 33 closed and valves 9, 11, 13, 21 and 26 open, the piston 15 is actuated by motor 16 at the desired frequency, i.e., any frequency of pump piston response the operator feels might give the desired results. Thus the movement of piston 15 vibrates the column of mercury in the chamber 12 sinusoidally (or generates a transcendental wave which approximates a sinusoid) and varies the system volume accordingly. This volume change causes a pressure fluctuation in the entire system, actuates the transducer 27 and causes the catalyst to adsorb or desorb in varying degrees which are dependent on the catalyst characteristics, the adsorbate gas characteristics, the temperature maintained, the average pressure maintained and the frequency and amplitude of pulsation.

It will now be understood by those skilled in the art that when piston 15 is actuated at a desired frequency $f_1$, or $[w_1/(2\pi)]$ (where $w_1$ is the angular frequency in radians/ min.), the transducer senses the pressure fluctuations and transforms them into electrical energy which is again transformed into a continuous record of pressure vs. time on the oscillograph chart. When the volume change $V-V_o = A \sin 2\pi f_1 t$, the pressure change $$P - P_o = B \sin 2\pi f_1 t - \alpha_1$$

$\alpha_1$ is the time lag or angle at which the pressure lags the volume and $t$ is the time. Thus a record of maximum and minimum volume, continuous pressure amplitude variation and temperature (kept constant) is measured, recorded and repeated as many times as desired at each and every frequency of interest.

It will be understood by those skilled in the art that a plot of $B/A$ (pressure amplitude divided by volume amplitude), versus the logarithm of the frequency will yield information that can be used in obtaining system rate constants but, preferably, the values of $B/A$ can be mathematically transformed into values of $C/B$ by means of the gas law equation (2) $PV = nRT$ and by use of the equation representing the change in moles adsorbed of the system gas where (3) $C = n - n_0 = 2\pi f_1 t - \alpha_1 - \beta_1$ where $\beta_1$ is the time lag or angle at which the moles adsorbed lags the pressure. This last calculation of $C/B$ when plotted vs. the logarithm of the frequency delineates the actual system adsorption rate constants.

Several changes may be made in our invention by those skilled in the art, without departing from its scope, for example:

Omitting the calcining step in order to study an unactivated catalyst, varying the range of pressure pulsation frequencies from supersonic and sound frequencies to very low frequencies; for instance one cycle per day; eliciting values of rate constants from the basic data by other mathematical computations other than those above set forth; using transcendental pulsations other than sinusoidal pulsations and other obvious changes too numerous to set forth in detail, in which,

We claim:

1. A method for determining rates of catalytic adsorbtion of gases comprising:
   (a) introducing gas into a system having a catalyst adsorbent therein;
   (b) cyclically varying the volumetric capacity of the system;
   (c) measuring the actual amplitude change in pressure of the system corresponding to the cyclical volumetric variations;
   (d) computing the adsorption rate characteristic from the measured change in pressure amplitude.

2. A method for determining rates of catalytic adsorbtion of gases comprising:
   (a) introducing gas into a system having a catalyst adsorbent therein;
   (b) cyclically varying the volumetric capacity of the system;
   (c) recording the actual change in pressure of the system resulting from the cyclical volumetric variations;
   (d) computing the adsorption rate characteristic from the measured change in pressure resulting from the cyclical volumetric variations.

3. A method for determining rates of catalytic adsorbtion of gases comprising:
   (a) introducing gas into a system having a catalyst adsorbent therein;
   (b) cyclically varying the volumetric capacity of the system;
   (c) measuring the actual amplitude change in pressure of the system corresponding to the cyclical volumetric variations;
   (d) recording the actual change in the pressure of the system resulting from the cyclical volumetric variations;
   (e) computing the adsorption rate characteristic from the measured amplitude change and measured change in pressure resulting from the cyclic volumetric variations.

4. An apparatus for determining rates of catalytic adsorption of gaseous matter comprising:
   (a) an adsorption chamber;
   (b) means for introducing gas into the chamber;
   (c) a pressure to electrical impulse transducer communicating with the interior of the chamber;
   (d) a pressure recording means connected to the transducer;
   (e) means for at least partially evacuating the chamber;
   (f) a catalyst in the chamber;
   (g) a selected gas in the chamber;
   (h) means for cyclically varying the gas pressure in the chamber, whereby the recording means records temporal and amplitude variations of gas pressure in the chamber.

References Cited by the Examiner

UNITED STATES PATENTS

| | | | |
|---|---|---|---|
| 2,889,701 | 6/59 | Skarstrom | 73—23 |
| 3,055,206 | 9/62 | Watson et al. | 73—19 X |
| 3,059,478 | 10/62 | Coggeshall et al. | 73—38 X |
| 3,073,149 | 1/63 | Mongan | 73—38 |

OTHER REFERENCES

Griffith, "The Mechanism of Contact Catalysis," 2nd ed., Oxford University Press, 1946. Pages 19, 20, 108–128 (chap. 4) and 126 specifically relied on.

ISAAC LISANN, *Primary Examiner.*